United States Patent
Price et al.

(10) Patent No.: US 12,008,112 B2
(45) Date of Patent: Jun. 11, 2024

(54) SYSTEMS AND METHODS FOR UNIFIED CYBER THREAT INTELLIGENCE SEARCHING

(71) Applicant: ZeroFOX, Inc., Baltimore, MD (US)

(72) Inventors: Michael Morgan Price, Baltimore, MD (US); Jason Emile Sumpter, Abingdon, MD (US); Andrew Peter Forestieri, Boiling Springs, PA (US)

(73) Assignee: ZeroFOX, Inc., Baltimore, MD (US)

( * ) Notice: Subject to any disclaimer, the term of this patent is extended or adjusted under 35 U.S.C. 154(b) by 0 days.

(21) Appl. No.: 17/646,432

(22) Filed: Dec. 29, 2021

(65) Prior Publication Data

US 2023/0205890 A1    Jun. 29, 2023

(51) Int. Cl.
*G06F 21/57* (2013.01)
*G06F 16/2458* (2019.01)
*G06F 16/28* (2019.01)
*G06F 21/55* (2013.01)

(52) U.S. Cl.
CPC ........ *G06F 21/577* (2013.01); *G06F 16/2471* (2019.01); *G06F 16/287* (2019.01); *G06F 21/552* (2013.01); *G06F 2221/2101* (2013.01)

(58) Field of Classification Search
CPC .. G06F 21/577; G06F 21/552; G06F 16/2471; G06F 16/287; G06F 2221/2101
See application file for complete search history.

(56) References Cited

U.S. PATENT DOCUMENTS

| | | | |
|---|---|---|---|
| 2019/0334942 A1* | 10/2019 | Wicker | H04L 63/1433 |
| 2019/0349351 A1* | 11/2019 | Verma | G06F 21/45 |
| 2020/0050586 A1* | 2/2020 | Pal | G06F 16/148 |
| 2021/0006573 A1* | 1/2021 | Britt | G06F 21/64 |

OTHER PUBLICATIONS

PCT International Application No. PCT/US22/82409, International Search Report and Written Opinion of the International Searching Authority, dated Feb. 13, 2023, 10 pages.

* cited by examiner

*Primary Examiner* — Noura Zoubair
(74) *Attorney, Agent, or Firm* — DLA PIPER LLP (US)

(57) ABSTRACT

Systems and methods are provided for unified cyberthreat searching.

20 Claims, 8 Drawing Sheets

SYSTEMS AND METHODS FOR UNIFIED CYBER THREAT INTELLIGENCE SEARCHING

BACKGROUND OF THE DISCLOSURE

Cyber Threat Intelligence (CTI) analysts, Incident Response and Forensics (IRF) analysts, threat hunters, and other related types of cybersecurity personnel, in researching and investigating cyber threats, typically use various feeds, paid tools, open-source tools, and internally-sourced information to gather intelligence, evidence, and/or artifacts. However, such a use of multiple independent tools often leads to overlapping efforts in data collection and unnecessary additions to overhead in the form of investigation time.

SUMMARY OF THE DISCLOSURE

According to one aspect of the present disclosure, a system for unified cyberthreat intelligence searching can include a data lake that can include a plurality of search clusters that provide access to a plurality of respective databases, wherein a first search cluster provides access to curated threat intelligence information and a second search cluster provides access to raw communication data; and a server that can include non-transitory computer-readable instructions which, when executed by at least one processor, cause the server to perform a process. The process can be operable to receive a query from a client endpoint; parse the query for at least one keyword; translate the parsed query into a plurality of search requests for the plurality of search clusters; search each of the plurality of search clusters with a respective search request; generate one or more intelligence cards, each intelligence card comprising a result from one of the plurality of search clusters; and cause the one or more intelligence cards to be displayed on the client endpoint.

In some embodiments, the process can be further operable to, prior to parsing the query for the at least one keyword, proxy the query. In some embodiments, each of the plurality of search clusters can be implemented as an Elasticsearch cluster. In some embodiments, the first search cluster provides access to raw communication data from at least one of Telegram, Discord, Dark Web, and Internet Relay Chat (IRC). In some embodiments, the second search cluster provides access to at least one of key incidents, advisories, and indicators of compromise. In some embodiments, the indicators of compromise can include one or more of an IP address, a malware hash, a URL, or a data breach identifier. In some embodiments, the data lake further can include a third search cluster that provides access to compromised credential information.

In some embodiments, the process can be further operable to receive, from the client endpoint, a selection of one or more filters, each filter indicating a request to search a selected search cluster; translate the parsed query into a search request for each of the one or more selected search clusters; and search each of the selected search clusters with a respective search request. In some embodiments, the data lake can further include a fourth search cluster that provides access to at least one of news, C2 domains, exploits, phishing, or ransomware.

According to another aspect of the present disclosure, a system for unified cyberthreat intelligence searching can include a data lake that can include a plurality of search clusters that provide access to a plurality of respective databases, wherein a first search cluster provides access to curated threat intelligence information and a second search cluster provides access to raw communication data; and a server that can include non-transitory computer-readable instructions which, when executed by at least one processor, cause the server to perform a process. The process can be operable to receive a query from an analyst endpoint; parse the query for at least one keyword; translate the parsed query into a plurality of search requests for the plurality of search clusters; search each of the plurality of search clusters with a respective search request; generate a plurality of intelligence cards, each intelligence card comprising a result from one of the plurality of search clusters; cause the plurality of intelligence cards to be displayed on the analyst endpoint; receive a selection of at least one of the plurality of intelligence cards from the analyst endpoint; and generate an investigation with the one or more selected intelligence cards.

In some embodiments, the process can be further operable to cause, in response to an indication from a client endpoint, the investigation to be displayed on a client endpoint. In some embodiments, each of the plurality of search clusters can be implemented as an Elasticsearch cluster. In some embodiments, the first search cluster provides access to raw communication data from at least one of Telegram, Discord, Dark Web, and Internet Relay Chat (IRC). In some embodiments, the second search cluster provides access to at least one of key incidents, advisories, and indicators of compromise. In some embodiments, the indicators of compromise can include one or more of an IP address, a malware hash, a URL, or a data breach identifier. In some embodiments, the data lake can further include a third search cluster that provides access to compromised credential information.

In some embodiments, the process can be further operable to receive, from the analyst endpoint, a selection of one or more filters, each filter indicating a request to search a selected search cluster; translate the parsed query into a search request for each of the one or more selected search clusters; and search each of the selected search clusters with a respective search request. In some embodiments, the data lake can further include a fourth search cluster that provides access to at least one of news, C2 domains, exploits, phishing, or ransomware. In some embodiments, the process further can be further operable to, prior to parsing the query for the at least one keyword, proxy the query.

According to another aspect of the present disclosure, a method for unified cyberthreat intelligence searching can include receiving, via a user interface on a client endpoint, a query from a user; transmitting, via the client endpoint, the query to a server operatively coupled to a data lake that can include a plurality of search clusters that provide access to a plurality of respective databases, a first search cluster providing access to curated threat intelligence information and a second search cluster providing access to raw communication data, wherein the server translates the query into search requests for each of the plurality of search clusters; receiving a plurality of intelligence cards for display on the client endpoint; receiving, via the user interface, a selection of at least one of the plurality of intelligence cards; and transmitting the selection to the server for generation of an investigation.

BRIEF DESCRIPTION OF THE FIGURES

FIGS. 4-6 are example interfaces within the CTI platform according to some embodiments of the present disclosure.

DESCRIPTION

The following detailed description is merely exemplary in nature and is not intended to limit the invention or the applications of its use.

Embodiments of the present disclosure relate to systems and methods for collecting finished threat intelligence, threat information, and threat data through a single interface. The disclosed system provides a unified search capability that allows for a user to obtain results from threat data, threat information, and threat intelligence with a single query. The results are returned to the user via a CTI platform on their device and include finished intelligence that has analyst feedback, raw data from covert channels for hacking conversations, and processed threat information with structured key value pairs. Such a unified search tool can inform incident response and threat hunting and proactively improve security posture by blocking new threat vectors.

Figure 1:
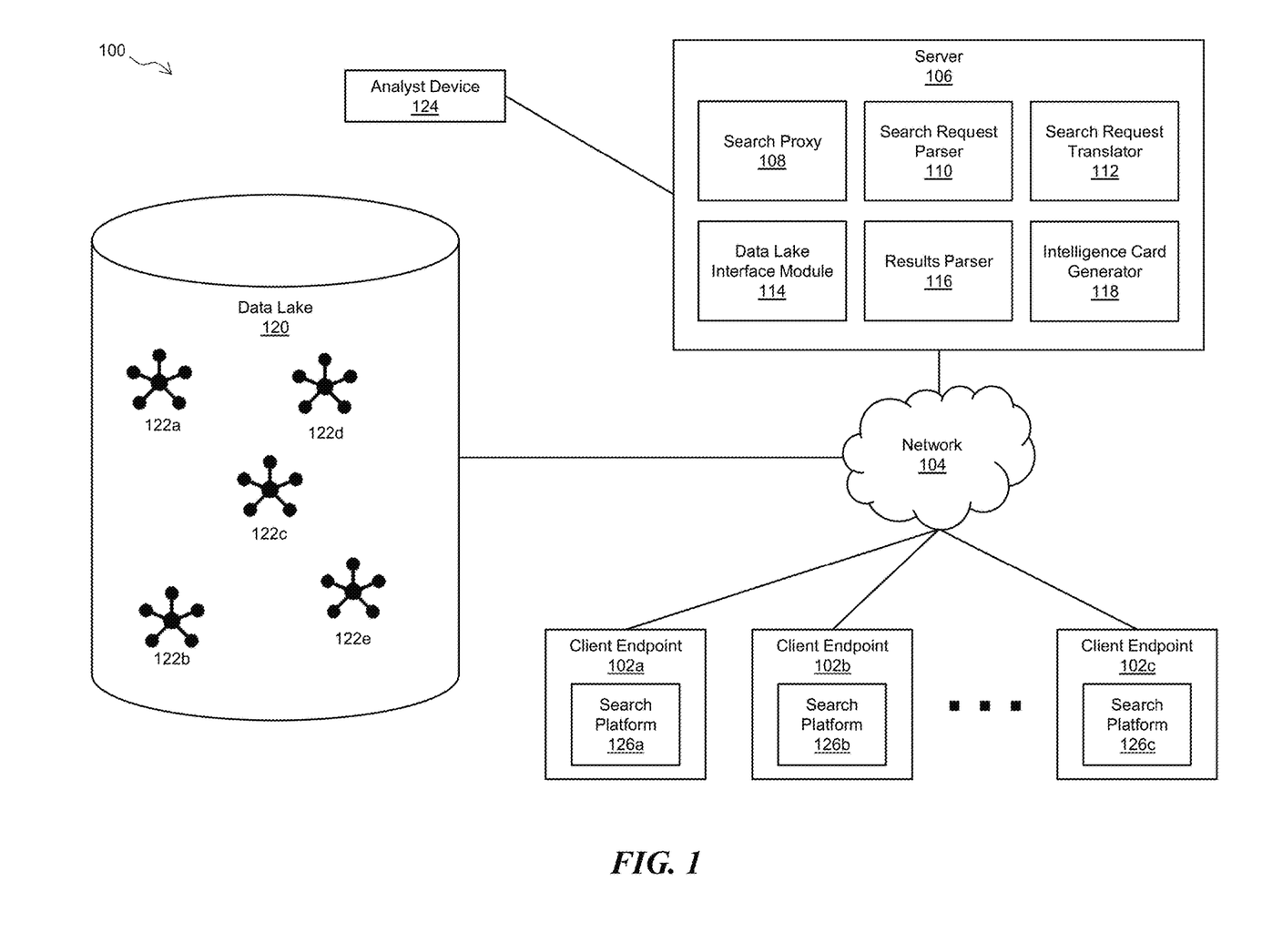
FIG. 1 is a block diagram of an example system for unified CTI searching according to some embodiments of the present disclosure.

FIG. 1 is a block diagram of an example system 100 for unified CTI searching according to some embodiments of the present disclosure. The system 100 can include a plurality of client endpoints 102a-c (generally referred to herein as a "client endpoint 102" or collectively referred to herein as "client endpoints 102"), an analyst device 124, and a server 106, which are communicably coupled via a network 104. In some embodiments, the system 100 can include any number of client endpoints 102. For example, an organization that offers cybersecurity services may have an extensive userbase with hundreds to thousands of users that connect to the system 100 via a client endpoint 102.

The system 100 further includes a data lake 120, which includes a plurality of search clusters 122a-e. Although there are five search clusters shown in FIG. 1, this is merely exemplary in nature and is not intended to be limiting. Server 106 can provide a client endpoint 102 with the capabilities to obtain results from any of the search clusters 122 in data lake 120 with just a single search query. Each search cluster 122 hosts data via an API to return results based on a query. In some embodiments, each search cluster 122 may be implemented as an Elasticsearch cluster that provides access to an indexed Elasticsearch database. Each search cluster 122 can include a number of servers/nodes that operate together in order to increase the amount of data stored and to respond coherently to numerous requests at the same time. Additionally, each search cluster 122 may be associated with a particular subset of data that can be used for CTI, such as threat data ("threat data" can herein refer to raw data that is minimally processed, such as data from a dark web forum and served directly to a user), threat information ("threat information can herein refer to data that is more substantively processed/parsed, an example being a malware sample with a classification, a note, related crypto wallets, and other metadata), and threat intelligence. The data lake includes finished intelligence that has analysis from an analyst, raw data from covert channels for hacking conversations, and processed threat information with structured key value pairs. For example, the data lake 120 can include raw communication data from Telegram, Discord, the Dark Web, and the Internet Relay Chat (IRC), which is a low-level computer-to-computer communication protocol typically used by hackers to communicate. The data lake 120 can also include finished and/or curated intelligence, such as key incidents (tactical short-form customer-focused finished intelligence), advisories (strategic global strategic intelligence), and indicators of compromise (IOCs, such as IP addresses, malware hashes, URLs, data breaches, etc.). The finished/curated intelligence data can have been added and curated by an analyst via analyst device 124. Furthermore, the data lake 120 can include hashes, domains, crypto wallets, breaking news, vulnerabilities, exploits, compromised credentials, compromised credit cards, C2 domains, phishing information, email addresses, phone numbers, and more. Each search cluster 122 can be associated with a specific type of data. For example, there can be a raw Telegram data search cluster or a compromised credentials search cluster.

A client endpoint 102 and/or an analyst device 124 can include one or more computing devices capable of receiving user input, transmitting and/or receiving data via the network 104, and or communicating with the server 106. In some embodiments, a client endpoint 102 and/or an analyst device 124 can be a conventional computer system, such as a desktop or laptop computer. Alternatively, a client endpoint 102 and/or an analyst device 124 can be a device having computer functionality, such as a personal digital assistant (PDA), a mobile telephone, a smartphone, or other suitable device. In some embodiments, a client endpoint 102 and/or an analyst device 124 can be the same as or similar to the computing device 800 described below with respect to FIG. 8. In some embodiments, the system 100 can include any number of client endpoints 102 and/or analyst devices 124.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

The server 106 may include any combination of one or more of web servers, mainframe computers, general-purpose computers, personal computers, or other types of computing devices. The server 106 may represent distributed servers that are remotely located and communicate over a communications network, or over a dedicated network such as a local area network (LAN). The server 106 may also include one or more back-end servers for carrying out one or more aspects of the present disclosure. In some embodiments, the server 106 may be the same as or similar to server 700 described below in the context of FIG. 7.

As shown in FIG. 1, each client endpoint 102 includes a search platform 126 (i.e., search platforms 126a-c). The search platform 126 can be a user-facing interface that enables a user to submit unified search requests. For example, the search platform 126 can include an entry screen where a user can manually type in a search query. In addition, the search platform 126 can include various search filters that a user may select, such as the type of dataset to be accessed. Additional details with respect to the search platform 126 are discussed in relation to FIGS. 4 and 5.

The server 106 includes a search proxy 108, a search request parser 110, a search request translator 112, a data lake interface module 114, a results parser 116, and an intelligence card generator 118. The search proxy 108 is configured to function as a gateway between the search platform 126 and backend services on the server 106, allowing transfer from a public API to a private data source and a return of the data back to a public interface. The search request parser 110 is configured to receive a search query (e.g., from a client endpoint 102 via the search platform 126) or a proxied search query from the search proxy 108. The parser 110 then parses the search query into various components which can be referred to as tokens and can be represented, for example, by a tree structure. The search request translator 112 is configured to translate the parsed search request into an Elasticsearch request. For example, the search request translator 112 takes an API call made from the search platform 126 with the query parameters and constructs a query in the Elastic query language. It is important to note that while Elasticsearch requests are referred to herein, Elasticsearch clusters are not the only possible clusters and that Elasticsearch requests may represent other, similar cluster-based search request known to a skilled artisan. In some embodiments, the search request translator 112 can translate the parsed search request into a plurality of Elasticsearch requests, such as for each search cluster 122 in the data lake 120.

The data lake interface module 114 is configured to interact with the data lake 120 and the various search clusters 122 and facilitate the searching of the individual search clusters. For example, the data lake interface module 114 submits each of the translated search requests to each search cluster 122 and receives results in return. The results parser 116 is configured to parse results received from the search clusters 122 and translate the results into a formatted search response that is viewable by a user on a client endpoint 102 via a search platform 126. The intelligence card generator 118 is configured to generate an intelligence card based on the search results. Additional details with respect to intelligence cards are discussed in relation to FIGS. 4 and 5.

Figure 2:
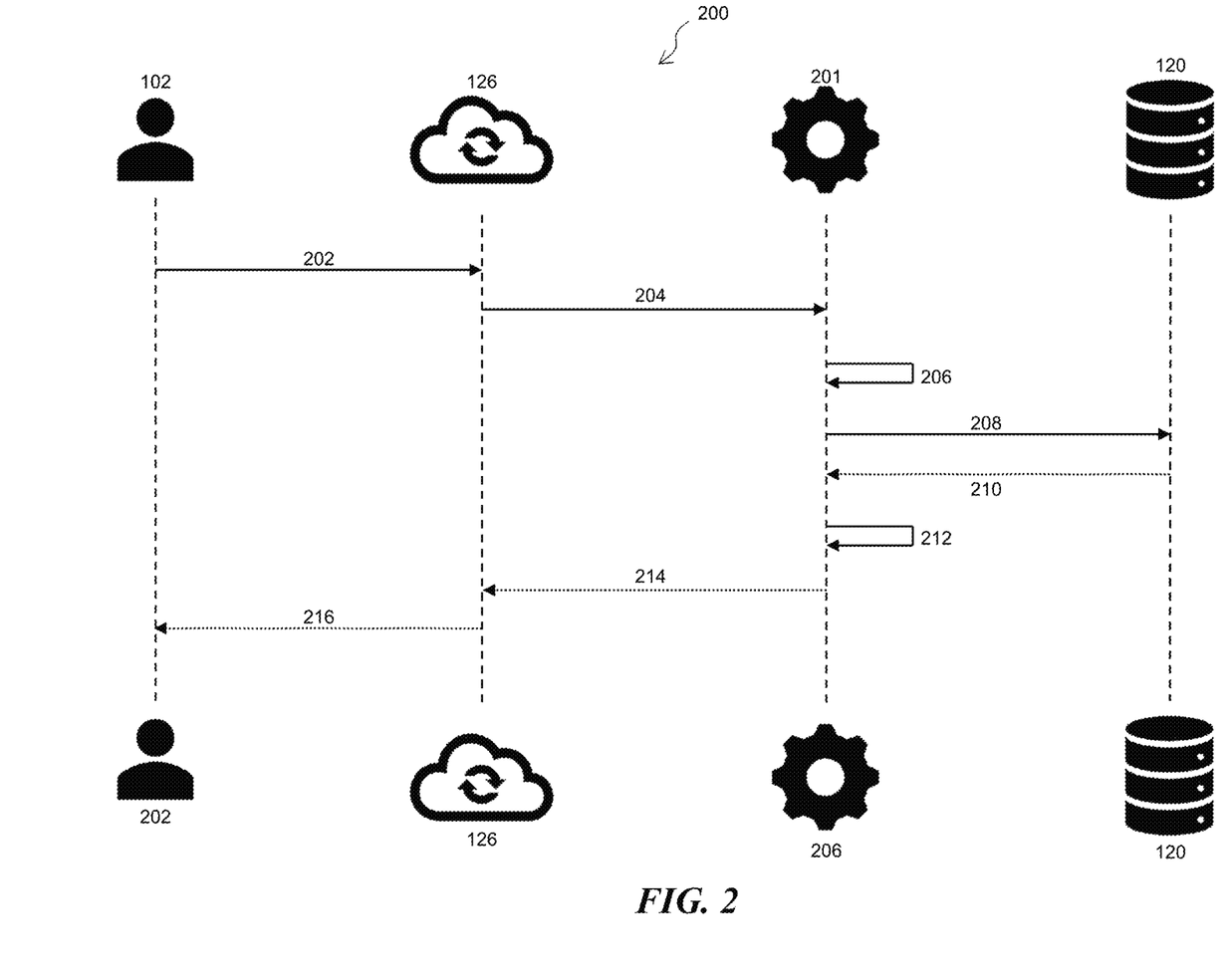
FIG. 2 is an example flow architecture for unified CTI searching within the system of FIG. 1 according to some embodiments of the present disclosure.

FIG. 2 is an example flow architecture 200 for unified CTI searching within the system of FIG. 1 according to some embodiments of the present disclosure. At 202, a user, via a client endpoint 102, submits a search request to the search platform 126. The search request can be submitted via a standard input interface (i.e., by typing). The user can search with keywords (e.g., "Microsoft") and Boolean logic. In addition, a user can select from various filters, such as definitions of which search clusters will actually be searched. For example, there may be search clusters of raw data (e.g., Dark Web, Telegram, Discord, IRC, etc.), search clusters of finished intelligence (e.g., Key Incidents, Advisories, etc.), and search clusters of other datasets (e.g., news, vulnerabilities, compromised credentials, C2 domains, exploits, malware, phishing, email addresses, phone numbers, credit cards, ransomware, etc.).

At 204, the search proxy 108 generates a proxy search request based on the user search request via an application programming interface (API) 201 (e.g., an Intel-API), which facilitates an interaction between the client endpoint 102 and the server 106. In some embodiments, the API 201 can include several search endpoints that service the intelligence viewing on the client endpoints 102 within the search platform 126. The API endpoints can live in the API so that they can build off existing Elastic access patterns in the API. At 206, the search request parser 110 parses the proxy search request and the search request translator 112 translates the parsed search request into an Elasticsearch request. In some embodiments, if multiple search clusters 122 have been selected in the search request, then the search request translator 112 translates the search request into an Elasticsearch request as necessary to search each cluster. At 208, the data lake interface module 114 submits the Elasticsearch request to the search clusters 122 within data lake 120. In some embodiments, if the user originally selected different filters and the request only designated certain clusters to search, the data lake interface module 114 would submit the Elasticsearch request only to the preselected search clusters 122.

At 210, the data lake interface module 114 receives search results from the search clusters 122 based on the search query. At 212, the results parser 116 parses and formats the results into a user-visualizable format. At 214, the formatted results are transmitted to the relevant search platform and, at 216, rendered for display on the client endpoint as an intelligence card (see FIGS. 4 and 5).

Figure 3:
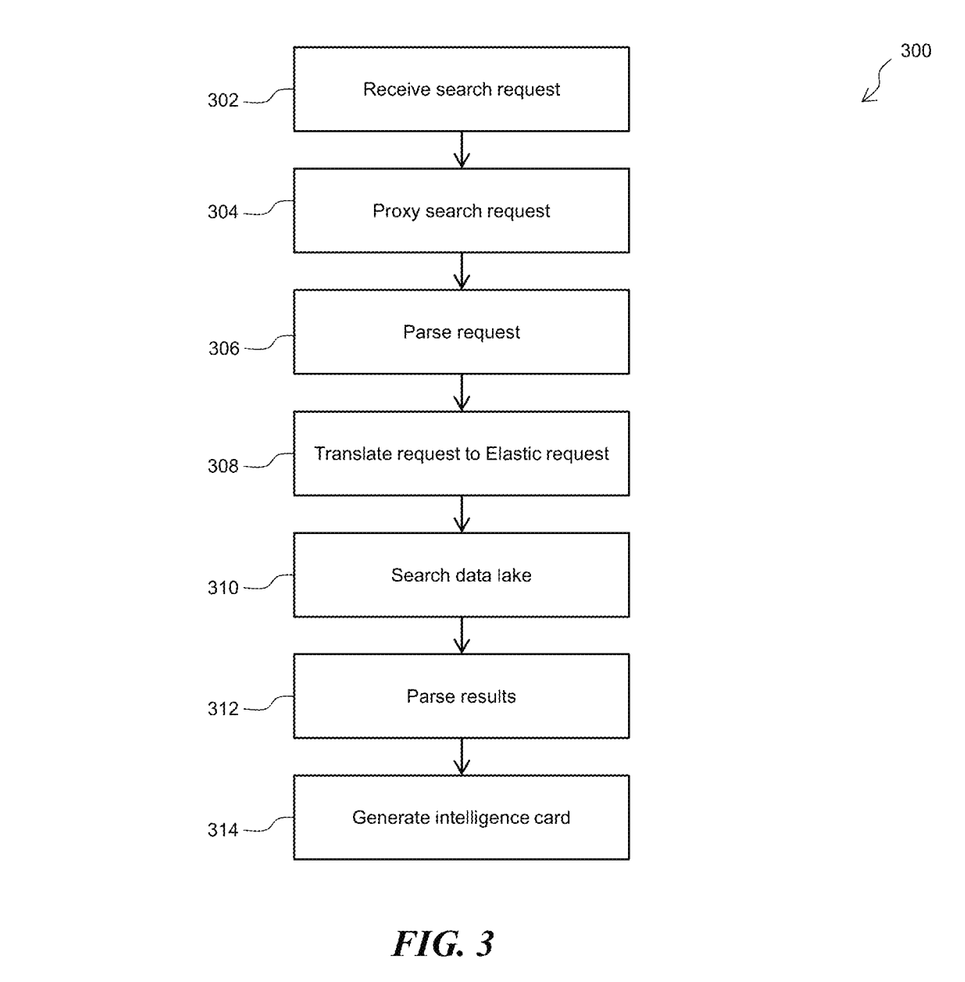
FIG. 3 is an example process that can be performed within the system of FIG. 1 according to some embodiments of the present disclosure.

FIG. 3 is an example process 300 that can be performed within the system of FIG. 1 according to some embodiments of the present disclosure. At block 302, the search platform 126 on a client endpoint 102 receives a search request (also referred to as a "query"). As discussed above, the search request can be submitted via a standard input interface (i.e., by typing) and can include keywords and filter selections. A user can choose from filter selectors on the search platform 126 to determine which search clusters will be searched and therefore what type of results will be returned. For example, a user could restrict search for instances of the word "Microsoft" being mentioned and restrict the search results to raw Telegram and Discord data to find conversations that mention Microsoft. At block 304, the search proxy 108 proxies the search request to the server 106. At block 306, the search request parser 110 parses the request for relevant information, such as keywords and selected filters.

At block 308, the search request translator 112 translate the search request into an Elasticsearch request. The search request translation is performed in accordance with the parsed results in the search request, such as if multiple search clusters 122 have been selected in the search request, then the search request translator 112 translates the search request into an Elasticsearch request as necessary to search each cluster. Referring to the example from above, if the user desires to search the Telegram and Discord search clusters, then the search request translator 112 generates a translated search request for each of the respective clusters. At block 310, the data lake interface module 114 interfaces with the data lake 120 to initiate searching of the relevant search clusters 122 by submitting the translated search request (i.e., the Elasticsearch request). At block 312, the results parser 116 parses the results obtained from the search clusters 122 by taking the results of the query and formatting them based off the expected results format in the user interface. At block 314, the intelligence card generator 118 formats the parsed results and generates an intelligence card to be displayed on the client endpoint 102 via the search platform 126.

Figure 5:
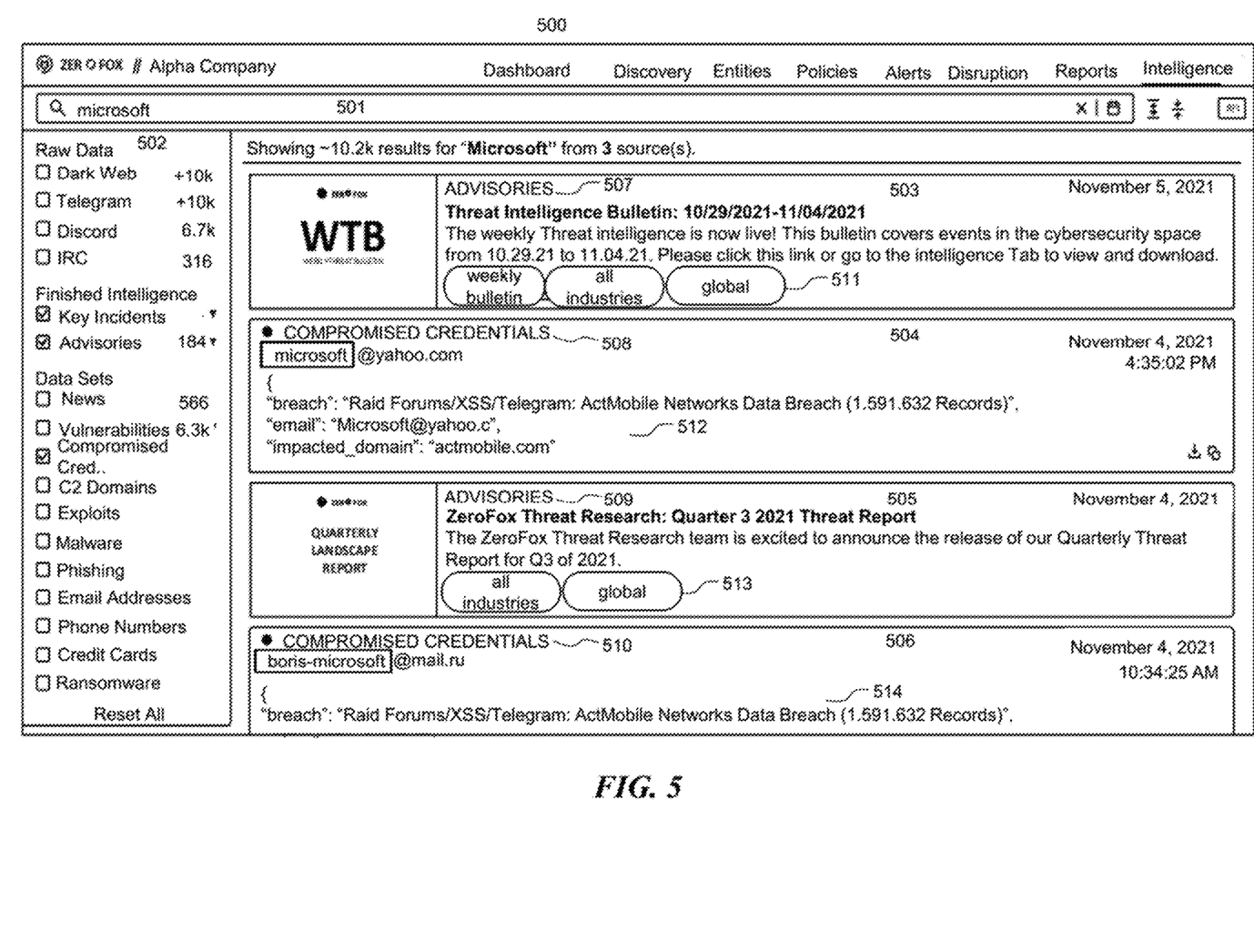
Figure 6:
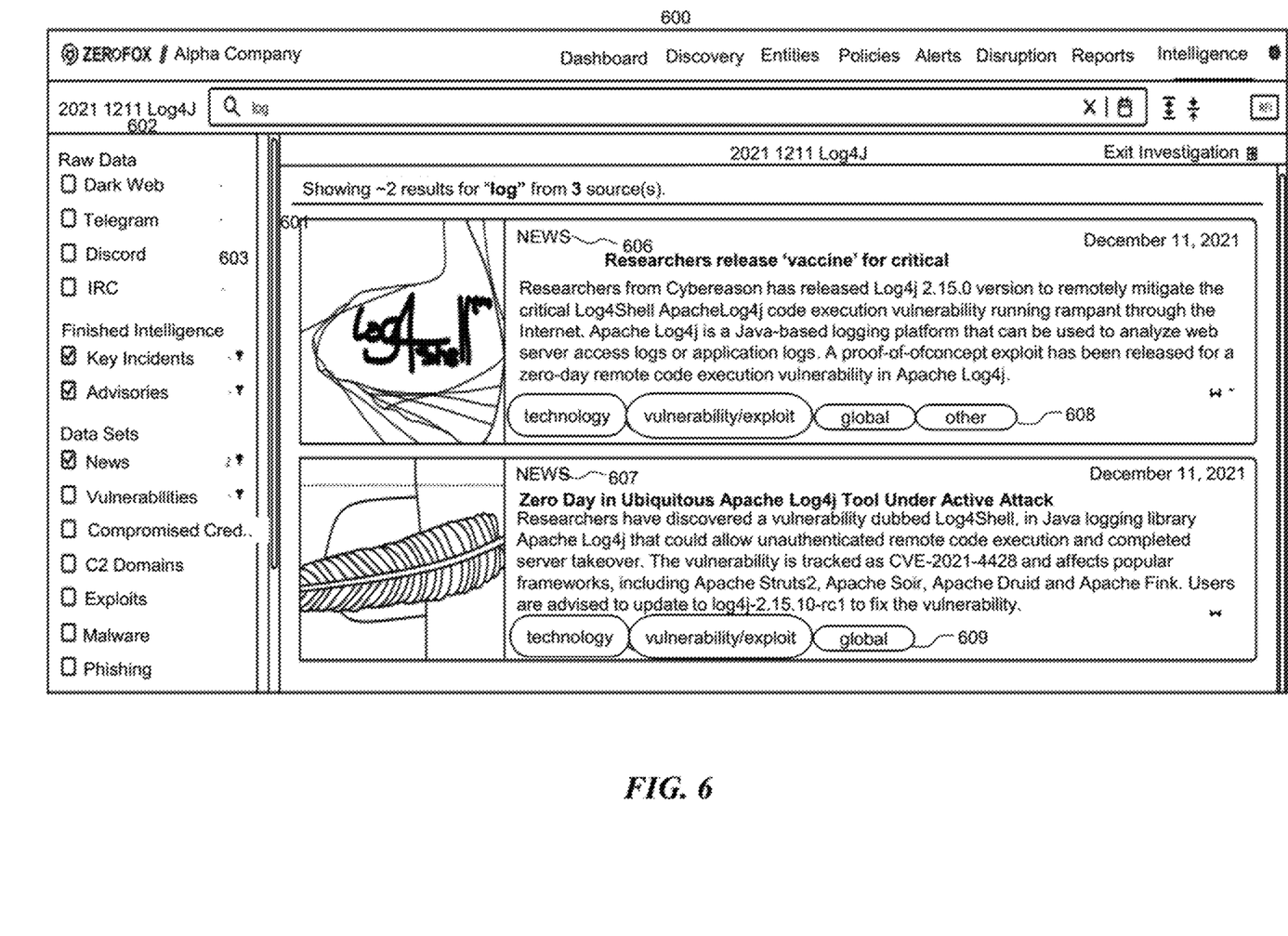

FIGS. 4-6 are example interfaces within the CTI search platform 126 according to some embodiments of the present disclosure. In particular, FIG. 4 shows an interface 400 where a user can use a single search query to generate results from multiple configured CTI sources. The interface 400 includes a search bar 401 where the user can enter search terms, such as individuals, organizations, and other keywords. The interface 400 also includes a filter section 402 that lists various filters by category. The filter section 402 can include raw data filters (e.g., Dark Web, Telegram, Discord, IRC, etc.), finished intelligence filters (e.g., Key Incidents, Advisories, etc.), and other dataset filters (e.g., news, vulnerabilities, compromised credentials, C2 domains, exploits, malware, phishing, email addresses, phone numbers, credit cards, ransomware, etc.). The user can click on the desired filters to select them. In interface 400, news, key incidents, and advisories have been selected.

FIG. 5 shows an interface 500 that shows the returned search results for an example user query. The interface 500 includes a search bar 501, where the user entered the keyword "Microsoft." In addition, key incidents, advisories, and compromised credentials were selected in the filter section 502. This means that, when the server 106 received the user's search request, a key incident search cluster 122, an advisory search cluster 122, and a compromised credentials search cluster 122 were searched. In addition, the interface 500 includes search results 503-506, which can also be referred to as intelligence cards. Intelligence card 503 is a Threat Intelligence Bulletin covering the dates 10/29/2021 through 11/04/2021, intelligence card 504 is a compromised email address, intelligence card 505 is a Threat Report, and intelligence card 506 is another compromised email address. The intelligence cards 503-506 include indicators 507-510 that indicate where the result came from (i.e., the type of result). For example, intelligence cards 503 and 505 have Advisory indicators 507 and 509, while intelligence cards 504 and 506 have Compromised Credentials indicators 508 and 510. Furthermore, intelligence cards 504 and 506 include information snippets 512 and 514, which can be in the form of a JSON response, describing the compromised credentials. Finally, the intelligence cards 503 and 505 have tags 511 and 513, respectively, indicating the relevant industry and what the intelligence cards are related to. In addition, each intelligence card 503-506 has phrases highlighted that match the original search term.

FIG. 6 shows an interface 600 for configuring an investigation, which can be defined as a curated collection of intelligence cards. The interface 600 includes a search bar 601, where the user entered "log" as a search keyword. The interface 600 also includes a selector 602 that indicates the investigation "20211211 Log4J" is being generated. In addition, key incidents, advisories, and news were selected in the filter section 603. This means that, when the server 106 received the user's search request, a key incident search cluster 122, an advisory search cluster 122, and a news search cluster 122 were searched. The interface 600 includes intelligence cards 604 and 605, which are both matching news articles (as demarcated by indicators 606 and 607). The intelligence cards 604 and 605 further include tags 608 and 609. Finally, the intelligence cards 604 and 605 include flags 610 and 611, respectively. When a user selects a flag, the associated intelligence card is added to the investigation.

Figure 7:
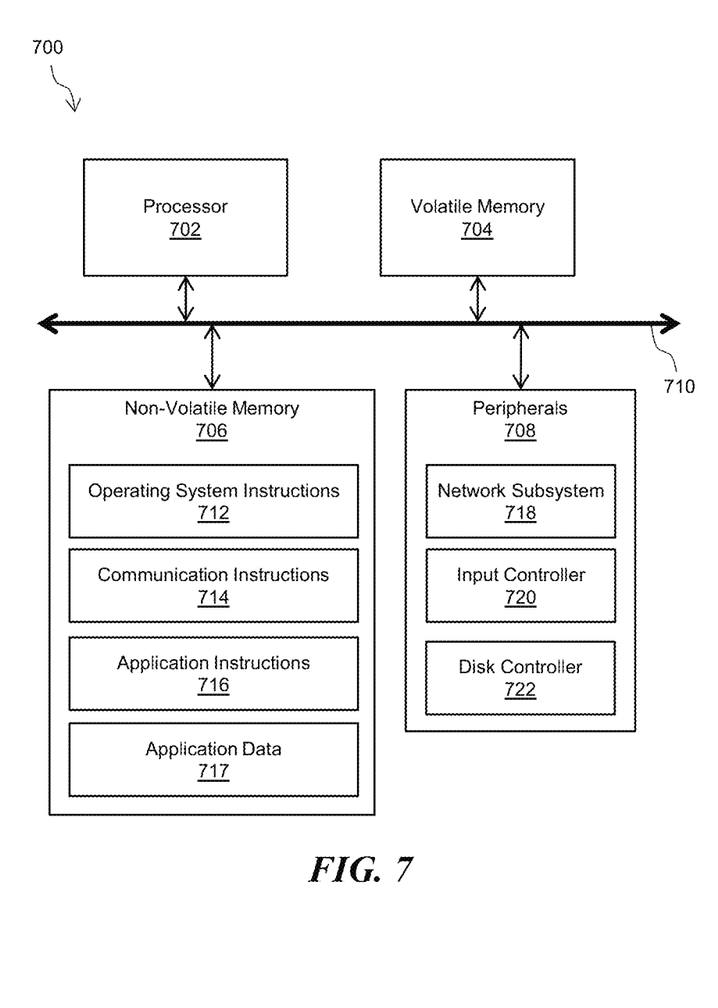
FIG. 7 is an example server device that can be used within the system of FIG. 1 according to an embodiment of the present disclosure.

FIG. 7 is a diagram of an example server device 700 that can be used within system 100 of FIG. 1. Server device 700 can implement various features and processes as described herein. Server device 700 can be implemented on any electronic device that runs software applications derived from complied instructions, including without limitation personal computers, servers, smart phones, media players, electronic tablets, game consoles, email devices, etc. In some implementations, server device 700 can include one or more processors 702, volatile memory 704, non-volatile memory 706, and one or more peripherals 708. These components can be interconnected by one or more computer buses 710.

Processor(s) 702 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 710 can be any known internal or external bus technology, including but not limited to ISA, EISA, PCI, PCI Express, USB, Serial ATA, or FireWire. Volatile memory 704 can include, for example, SDRAM. Processor 702 can receive instructions and data from a read-only memory or a random access memory or both. Essential elements of a computer can include a processor for executing instructions and one or more memories for storing instructions and data.

Non-volatile memory 706 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 706 can store various computer instructions including operating system instructions 712, communication instructions 714, application instructions 716, and application data 717. Operating system instructions 712 can include instructions for implementing an operating system (e.g., Mac OS®, Windows®, or Linux). The operating system can be multi-user, multiprocessing, multitasking, multithreading, real-time, and the like. Communication instructions 714 can include network communications instructions, for example, software for implementing communication protocols, such as TCP/IP, HTTP, Ethernet, telephony, etc. Application instructions 716 can include instructions for various applications. Application data 717 can include data corresponding to the applications.

Peripherals 708 can be included within server device 700 or operatively coupled to communicate with server device 700. Peripherals 708 can include, for example, network subsystem 718, input controller 720, and disk controller 722. Network subsystem 718 can include, for example, an Ethernet of WiFi adapter. Input controller 720 can be any known input device technology, including but not limited to a keyboard (including a virtual keyboard), mouse, track ball, and touch-sensitive pad or display. Disk controller 722 can include one or more mass storage devices for storing data files; such devices include magnetic disks, such as internal hard disks and removable disks; magneto-optical disks; and optical disks.

Figure 8:
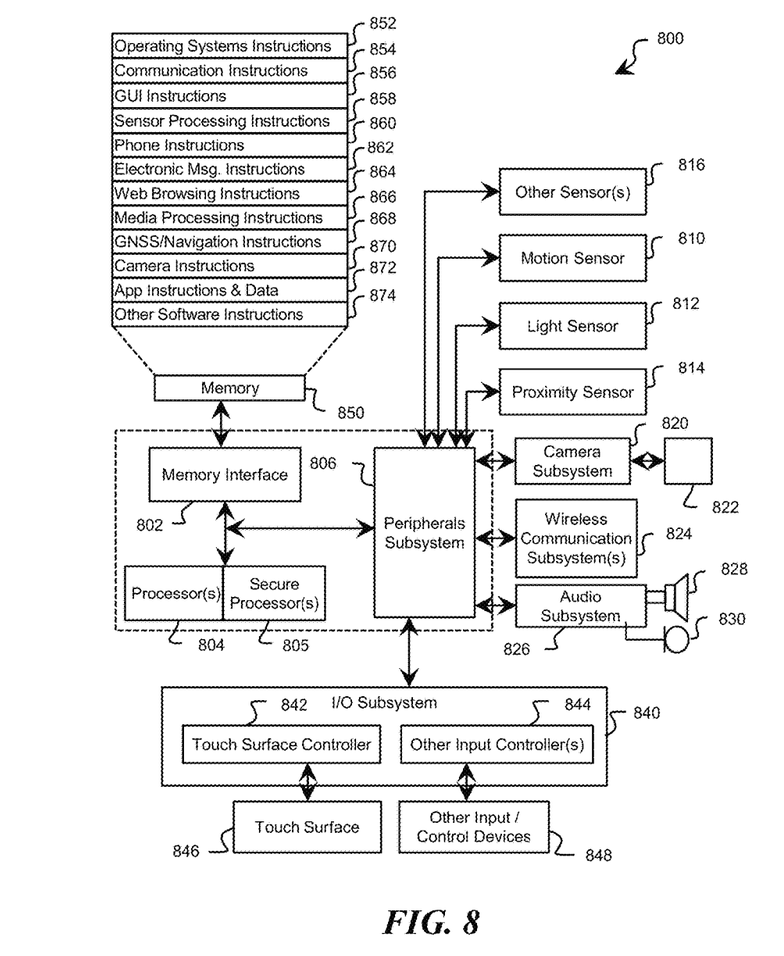
FIG. 8 is an example computing device that can be used within the system of FIG. 1 according to an embodiment of the present disclosure.

FIG. 8 is an example computing device that can be used within the system 100 of FIG. 1, according to an embodiment of the present disclosure. In some embodiments, device 800 can be endpoint 102. The illustrative user device 800 can include a memory interface 802, one or more data processors, image processors, central processing units 804, and/or secure processing units 805, and peripherals subsystem 806. Memory interface 802, one or more central processing units 804 and/or secure processing units 805, and/or peripherals subsystem 806 can be separate components or can be integrated in one or more integrated circuits. The various components in user device 800 can be coupled by one or more communication buses or signal lines.

Sensors, devices, and subsystems can be coupled to peripherals subsystem 806 to facilitate multiple functionalities. For example, motion sensor 810, light sensor 812, and proximity sensor 814 can be coupled to peripherals subsystem 806 to facilitate orientation, lighting, and proximity functions. Other sensors 816 can also be connected to peripherals subsystem 806, such as a global navigation satellite system (GNSS) (e.g., GPS receiver), a temperature sensor, a biometric sensor, magnetometer, or other sensing device, to facilitate related functionalities.

Camera subsystem 820 and optical sensor 822, e.g., a charged coupled device (CCD) or a complementary metal-oxide semiconductor (CMOS) optical sensor, can be utilized to facilitate camera functions, such as recording photographs and video clips. Camera subsystem 820 and optical sensor 822 can be used to collect images of a user to be used during authentication of a user, e.g., by performing facial recognition analysis.

Communication functions can be facilitated through one or more wired and/or wireless communication subsystems 824, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 824. The specific design and implementation of communication subsystems 824 can depend on the communication network(s) over which the user device 800 is intended to operate. For example, user device 800 can include communication subsystems 824 designed to operate over a GSM network, a GPRS network, an EDGE network, a WiFi or WiMax network, and a Bluetooth™ network. For example, wireless communication subsystems 824 can include hosting protocols such that device 800 can be configured as a base station for other wireless devices and/or to provide a WiFi service.

Audio subsystem 826 can be coupled to speaker 828 and microphone 830 to facilitate voice-enabled functions, such as speaker recognition, voice replication, digital recording, and telephony functions. Audio subsystem 826 can be configured to facilitate processing voice commands, voiceprinting, and voice authentication, for example.

I/O subsystem 840 can include a touch-surface controller 842 and/or other input controller(s) 844. Touch-surface controller 842 can be coupled to a touch-surface 846. Touch-surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In some implementations, a pressing of the button for a first duration can disengage a lock of touch-surface 846; and a pressing of the button for a second duration that is longer than the first duration can turn power to user device 800 on or off. Pressing the button for a third duration can activate a voice control, or voice command, module that enables the user to speak commands into microphone 830 to cause the device to execute the spoken command. The user can customize a functionality of one or more of the buttons. Touch-surface 846 can, for example, also be used to implement virtual or soft buttons and/or a keyboard.

In some implementations, user device 800 can present recorded audio and/or video files, such as MP3, AAC, and MPEG files. In some implementations, user device 800 can include the functionality of an MP3 player, such as an iPod™. User device 800 can, therefore, include a 36-pin connector and/or 8-pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store an operating system 852, such as Darwin, RTXC, LINUX, UNIX, OS X, Windows, or an embedded operating system such as VxWorks.

Operating system 852 can include instructions for handling basic system services and for performing hardware dependent tasks. In some implementations, operating system 852 can be a kernel (e.g., UNIX kernel). In some implementations, operating system 852 can include instructions for performing voice authentication.

Memory 850 can also store communication instructions 854 to facilitate communicating with one or more additional devices, one or more computers and/or one or more servers. Memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic messaging-related process and functions; web browsing instructions 864 to facilitate web browsing-related processes and functions; media processing instructions 866 to facilitate media processing-related functions and processes; GNSS/Navigation instructions 868 to facilitate GNSS and navigation-related processes and instructions; and/or camera instructions 870 to facilitate camera-related processes and functions.

Memory 850 can store application (or "app") instructions and data 872, such as instructions for the apps described above in the context of FIGS. 1-6 and for modules 108-118. Memory 850 can also store other software instructions 874 for various other software applications in place on device 800.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A system for unified cyberthreat intelligence searching comprising:
 a data lake comprising a plurality of search clusters that provide access to a plurality of respective databases, wherein a first search cluster provides access to curated threat intelligence information and a second search cluster provides access to raw conversation data from at least one communication channel, wherein the first search cluster is communicably coupled to at least one analyst device and is configured to receive and store a curated threat report from the at least one analyst device, wherein the at least one analyst device is configured to:
  cause a graphical user interface to be displayed, the graphical user interface comprising intelligence data;
  receive at least one input from an analyst via the graphical user interface;
  modify the intelligence data via the at least one input to generate the curated threat report; and
  transmit the curated threat report to the first search cluster; and
 a server comprising non-transitory computer-readable instructions which, when executed by at least one processor, cause the server to perform a process operable to:
  receive a query from a client endpoint;
  parse the query for at least one keyword;
  translate the parsed query into a plurality of search requests for the plurality of search clusters;
  search each of the plurality of search clusters with a respective search request;
  generate a plurality of intelligence cards, each intelligence card comprising a result from one of the plurality of search clusters, including at least one result from the first search cluster based on the curated threat report;
  cause the plurality of intelligence cards to be displayed on the client endpoint;
  receive a selection of at least one of the plurality of intelligence cards from the client endpoint; and
  generate an investigation with the selected intelligence cards.

2. The system of claim 1, wherein the process further is further operable to, prior to parsing the query for the at least one keyword, proxy the query.

3. The system of claim 1, wherein each of the plurality of search clusters is implemented as an Elasticsearch cluster.

4. The system of claim 1, wherein the first search cluster provides access to raw communication data from at least one of Telegram, Discord, Dark Web, and Internet Relay Chat (IRC).

5. The system of claim 1, wherein the second search cluster provides access to at least one of key incidents, advisories, and indicators of compromise.

6. The system of claim 5, wherein the indicators of compromise comprise one or more of an IP address, a malware hash, a URL, or a data breach identifier.

7. The system of claim 1, wherein the data lake further comprises a third search cluster that provides access to compromised credential information.

8. The system of claim 1, wherein the process is further operable to:
receive, from the client endpoint, a selection of one or more filters, each filter indicating a request to search a selected search cluster;
translate the parsed query into a search request for each of the one or more selected search clusters; and
search each of the selected search clusters with a respective search request.

9. The system of claim 1, wherein the data lake further comprises a fourth search cluster that provides access to at least one of news, Command and Control (C2) domains, exploits, phishing, or ransomware.

10. A system for unified cyberthreat intelligence searching comprising:
a data lake comprising a plurality of search clusters that provide access to a plurality of respective databases, wherein a first search cluster provides access to curated threat intelligence information and a second search cluster provides access to raw conversation data from at least one communication channel, wherein the first search cluster is communicably coupled to at least one analyst device and is configured to receive and store a curated threat report from the at least one analyst device, wherein the at least one analyst device is configured to:
cause a graphical user interface to be displayed, the graphical user interface comprising intelligence data;
receive at least one input from an analyst via the graphical user interface;
modify the intelligence data via the at least one input to generate the curated threat report; and
transmit the curated threat report to the first search cluster; and
a server comprising non-transitory computer-readable instructions which, when executed by at least one processor, cause the server to perform a process operable to:
receive a query from an analyst endpoint;
parse the query for at least one keyword;
translate the parsed query into a plurality of search requests for the plurality of search clusters;
search each of the plurality of search clusters with a respective search request;
generate a plurality of intelligence cards, each intelligence card comprising a result from one of the plurality of search clusters, including at least one result from the first search cluster based on the curated threat report;
cause the plurality of intelligence cards to be displayed on the analyst endpoint;
receive a selection of at least one of the plurality of intelligence cards from the analyst endpoint; and
generate an investigation with the selected intelligence cards.

11. The system of claim 10, wherein the process is further operable to cause, in response to an indication from a client endpoint, the investigation to be displayed on a client endpoint.

12. The system of claim 10, wherein each of the plurality of search clusters is implemented as an Elasticsearch cluster.

13. The system of claim 10, wherein the first search cluster provides access to raw communication data from at least one of Telegram, Discord, Dark Web, and Internet Relay Chat (IRC).

14. The system of claim 10, wherein the second search cluster provides access to at least one of key incidents, advisories, and indicators of compromise.

15. The system of claim 14, wherein the indicators of compromise comprise one or more of an IP address, a malware hash, a URL, or a data breach identifier.

16. The system of claim 10, wherein the data lake further comprises a third search cluster that provides access to compromised credential information.

17. The system of claim 10, wherein the process is further operable to:
receive, from the analyst endpoint, a selection of one or more filters, each filter indicating a request to search a selected search cluster;
translate the parsed query into a search request for each of the one or more selected search clusters; and
search each of the selected search clusters with a respective search request.

18. The system of claim 10, wherein the data lake further comprises a fourth search cluster that provides access to at least one of news, Command and Control (C2) domains, exploits, phishing, or ransomware.

19. The system of claim 10, wherein the process further is further operable to, prior to parsing the query for the at least one keyword, proxy the query.

20. A method for unified cyberthreat intelligence searching comprising:
receiving, via a user interface on a client endpoint, a query from a user;
transmitting, via the client endpoint, the query to a server operatively coupled to a data lake comprising a plurality of search clusters that provide access to a plurality of respective databases, a first search cluster providing access to curated threat intelligence information and a second search cluster providing access to raw conversation data from at least one communication channel, wherein the first search cluster is communicably coupled to at least one analyst device and is configured to receive and store a curated threat report from the at least one analyst device, wherein the server parses and translates the query into search requests for each of the plurality of search clusters, wherein the at least one analyst device is configured to:
cause a graphical user interface to be displayed, the graphical user interface comprising intelligence data;
receive at least one input from an analyst via the graphical user interface;
modify the intelligence data via the at least one input to generate the curated threat report; and
transmit the curated threat report to the first search cluster;
generating a plurality of intelligence cards, each intelligence card comprising a result from one of the plurality of search clusters, including at least one result from the first search cluster based on the curated threat report;

receiving the plurality of intelligence cards for display on the client endpoint;
receiving, via the user interface, a selection of at least one of the plurality of intelligence cards; and
transmitting the selection to the server for generation of an investigation.

* * * * *